Figure 1:
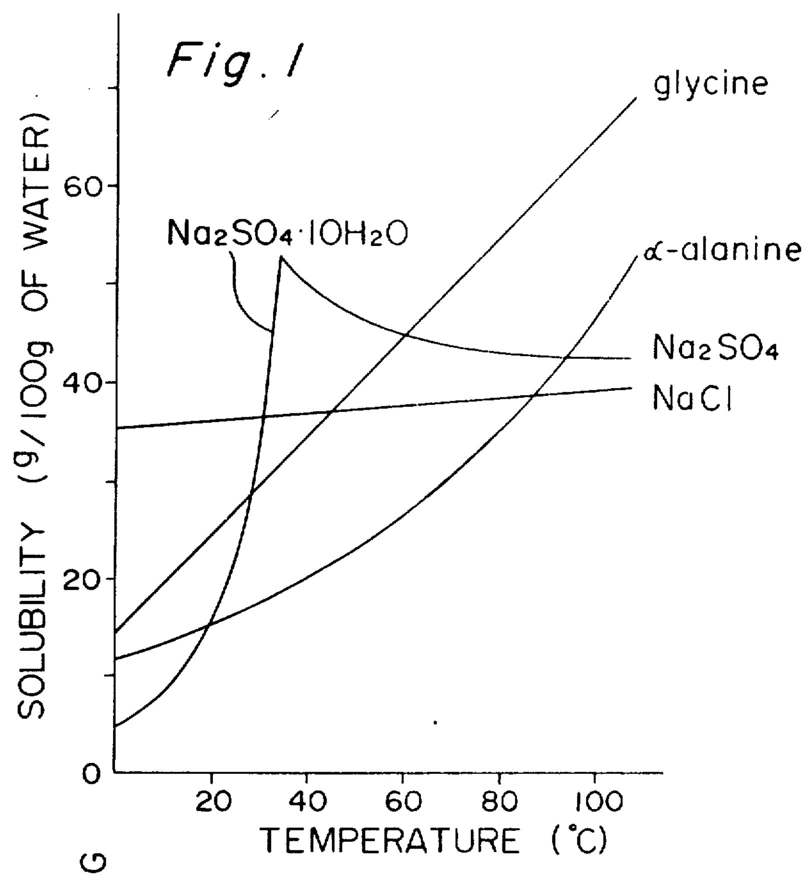

United States Patent [19]
Mihara et al.

[11] 3,875,221
[45] Apr. 1, 1975

[54] PROCESS FOR THE COMMERICAL PREPARATION OF LOWER AMINO ACIDS

[75] Inventors: Nobutake Mihara; Osamu Furuya; Koichi Wada, all of Yokohama, Japan

[73] Assignee: Showa Denko Kabushiki Kaisha, Tokyo, Japan

[22] Filed: July 6, 1973

[21] Appl. No.: 377,031

[30] Foreign Application Priority Data

Aug. 8, 1972 Japan ................................ 47-78756

[52] U.S. Cl. ......................... 260/534 R, 260/534 C
[51] Int. Cl. .................... C07c 101/06, C07c 101/08
[58] Field of Search ..................... 260/534 C, 534 R

[56] References Cited

UNITED STATES PATENTS

| | | | |
|---|---|---|---|
| 3,267,130 | 8/1966 | Kato et al. | 260/534 |
| 3,813,434 | 5/1974 | Marans | 260/534 |

*Primary Examiner*—James A. Patten
*Attorney, Agent, or Firm*—Sherman & Shalloway

[57] ABSTRACT

A commercial process for preparing glycine or alpha-alanie which consists of carrying out in successively disposed vessels the steps of introducing gaseous ammonia into an aqueous solution of glycolonitrile or lactonitrile to form an aqueous solution containing glycinonitrile or alpha-aminopropionitrile, hydrolyzing the resulting aqueous solution with an aqueous alkaline solution to obtain an aqueous solution of the corresponding alkali metal salt of a lower amino acid, treating the resulting aqueous solution with a mineral acid or its ammonium salt to obtain an aqueous solution containing a free lower amino acid and an alkali metal salt of a mineral acid, and thereafter submitting this aqueous solution to fractional crystallization in the presence of ammonia to isolate and recover the corresponding lower amino acid.

1 Claim, 3 Drawing Figures glycine
Na2SO4·10H2O
α-alanine
Na2SO4
NaCl
SOLUBILITY (g/100g OF WATER)
0
20
40
60
20
40
60
80
100
TEMPERATURE (°C)

(30°C)
glycine
NaCl
α-alanine
Na2SO4
SOLUBILITY (g/100g OF WATER CONTAINING AMMONIA)
0
20
40
0
7
14
21
28
AMMONIA CONTENT IN WATER (% BY WEIGHT)

(80°C)
glycine
α-alanine
Na2SO4
NaCl
SOLUBILITY
(g/100g OF WATER CONTAINING AMMONIA)
60
50
40
30
20
10
0
0
5
10
AMMONIA CONTENT IN WATER
(% BY WEIGHT)

PROCESS FOR THE COMMERICAL PREPARATION OF LOWER AMINO ACIDS

This invention relates to a process for preparing lower amino acids on a commercial scale and, in particular, to a commercial process for preparing either glycine or alpha-alanine by the amination of either glycolonitrile or lactonitrile followed by hydrolysis.

While numerous methods of synthesizing such amino acids in the laboratory have been known hitherto, those methods that are actually being practiced on a commercial scale are as follows: Glycine is presently being prepared by a method of reacting monochloroacetic acid with a great excess of ammonia water, i.e., by the so-called monochloroacetic acid method; and a method which consists of reacting sodium cyanide, formalin, ammonia water and carbon dioxide to form hydantoin and thereafter hydrolyzing this, i.e., by the so-called hydantoin method. Further, while there has also been tried a method of reacting hydrocyanic acid, ammonia and formalin all at once to form glycinonitrile by the so-called Strecker method and thereafter hydrolyzing the resulting glycinonitrile to obtain glycine, this method has not yet succeeded as a commercial method. Alanine is being prepared commercially principally by the hydantoin method. In the case of the above monochloroacetic acid method, the starting monochloroacetic acid is realtively expensive and, in addition, the reaction is carried out in an exceedingly dilute aqueous medium, using ammonia water in a great excess of several ten times. Hence, only an aqueous solution containing a small percent of the intended product can be formed, with the consequence that it is uneconomical, since there is the requirement of enlarging the size of the equipment, and there is an increase in the expense needed for the concentration operation. In the hydantoin method the ammonium carbonate, ammonium bicarbonate and ammonium carbamate that form during the reaction as by-products give various troubles, i.e., these by-products separate out as solids in the reactor and tend to clog the valves and thus hinder the smooth operation of the reaction. Further, since ammonium carbamate corrodes iron, there is the requirement to use equipment made of expensive material.

The present invention provides a process for preparing either glycine or alpha-alanine commercially advantageously from either glycolonitrile or lactonitrile.

The process for preparing glycine or alpha-alanine from glycolonitrile or lactonitrile on a laboratory scale has been known heretofore. The process in the case of glycine consisted of aminating glycolonitrile to form glycinonitrile followed by hydrolyzing the glycinonitrile with an alkali to form an alkali metal salt of glycine, and thereafter collecting the free glycine from said alkali metal salt. However, such a process of synthesizing glycine in the laboratory could not be directly applied to the process of preparing glycine on a commercial scale, because the reaction steps used in the foregoing process of synthesis were substantially uneconomical when applied on a commercial scale or involved a number of factors which would cause difficulty. For instance, it is known to use either ammonia water or liquid ammonia as the amination agent in the step of converting glycolonitrile contained in an aqueous solution to glycinonitrile by amination. However, in the case of ammonia water a fully satisfactory rate of conversion to glycinonitrile is not demonstrated. On the other hand, while in the case of liquid ammonia a satisfactory rate of conversion is demonstrated, there is a necessity in this case for a pressure-resistant reacting equipment. In addition, expensive equipment is necessary for recovering the excess ammonia used as liquid ammonia and for recycling it. Hence, this method is not a commercially advantageous method. Further, much difficulty is experienced in isolating and recovering the free glycine from the alkali metal salt of glycine in the final step. The reason is that when the alkali metal salt of glycine is treated with a mineral acid, free glycine is formed but, at the same time, an equivalent of an alkali metal salt of the mineral acid is formed, with the consequence that these two components must be separated. However, since there is not much difference between the solubility in water of these two components, considerable trouble is involved in the separation of the two by fractional crystallization. Further, owing to the fact that the lower amino acids have a strong tendency to hydration, there is no suitable solvent and, hence, the separation of the two components by the solvent extraction procedure is also impossible. Such being the case, the collection of the glycine from the aqueous solution of the alkali metal salt of glycine was carried out in the laboratory by the use of a cation-exchange resin. However, such a method is inefficient economically in that a large amount of the ion-exchange resin must be used which involves its regeneration and renewal as well. Hence, it goes without saying that this method is not suitable for application on a commercial scale.

According to the present invention, in consequence of extensive researches involving numerous experiments with a view to overcoming the difficulties and shortcomings that had hampered the application to the commercial scale practice of the laboratory scale method of synthesis such as hereinbefore described, a process of preparing the free lower amino acid from the corresponding glycolonitrile or lactonitrile advantageously on a commercial scale was established by modifying or improving on the procedures to be followed in the several steps of the synthesis and by providing the proper reaction conditions.

The commercial preparation of the lower amino acids selected from glycine and alpha-alanine is accomplished by carrying out in successively disposed vessels the following steps of 1. feeding continuously to a reactor an aqueous cyanohydrin solution of a member of the group consisting of glycolonitrile and lactonitrile, and at least about 3 mols of gaseous ammonia per each mol of the cyanohydrin and carrying out the reaction at a temperature below about 70°C. under autogeneous pressure to form a reaction solution containing the corresponding glycinonitrile or alpha-aminopropionitrile, while in the meantime transferring the reaction solution successively to a separate vessel, where the pressure is released and reverted to normal atmospheric pressure, and recycling to the foregoing reaction the excess ammonia gas that is flashed thereby;

2. contacting the aqueous solution of either glycinonitrile or alpha-aminopropionitrile obtained in (1), at a temperature lower than the boiling point of said aqueous solution under normal atmospheric pressure or slightly less, with an aqueous alkaline solution containing a stoichiometric amount or slight excess of a caustic alkali to obtain by hydrolysis an aqueous solution of an alkali metal salt of the corresponding lower amino acid;

3. treating the aqueous solution of an alkali metal salt of a lower amino acid obtained in (2) with a stoichiometric amount of a reagent selected from sulfuric acid, hydrochloric acid and the ammonium salts thereof to obtain an aqueous solution containing the corresponding alkali metal salt of a mineral acid and free lower amino acid; and 4. submitting the aqueous solution obtained in (3) to fractional crystallization in the presence of ammonia to isolate and recover the lower amino acid.

Preferred embodiments and advantages of the present invention will be more fully described below. For simplifying the discussion, the preparation of principally glycine will be described, but it is to be understood that substantially the same procedures are applicable in the case of the preparation of alpha-alanine. The hereinabove steps, when expressed by chemical equations, are as indicated below. In this case, there has, however, been used sodium hydroxide as the caustic alkali and sulfuric acid has been used as the mineral acid.

1. $HOCH_2CN + NH_3 \rightarrow H_2NCH_2CN + H_2O$
2. $H_2NCH_2CN + H_2O + NaOH \rightarrow H_2NCH_2COONa + NH_3$
3. $H_2NCH_2COONa + \frac{1}{2}H_2SO_4 \rightarrow H_2NCH_2COOH + \frac{1}{2}Na_2SO_4$
4. Separation of $H_2NCH_2COOH$ and $Na_2SO_4$ The glycolonitrile used in step 1 as the starting material, as is well known, can be readily prepared by reacting formalin with hydrocyanic acid. It goes without saying that glycolonitrile obtained by other methods can also be used, but the product prepared by the foregoing method is least expensive and thus will be most advantageous. When commercially available formalin of high concentration, i.e., an aqueous solution containing 37 to 40 weight % of formaldehyde, and an equivalent of liquid hydrocyanic acid are mixed and reacted, the reaction proceeds substantially quantitatively, with the result that an aqueous solution containing glycolonitrile at a concentration of about 50 % is obtained. The glycolonitrile used as the starting material in this invention is imposed no restriction as regards its concentration. Generally speaking, a solution of high concentration of the glycolonitrile and hence small content of water is to preferred, however, a feature of the invention is that even a relatively dilute solution of about 30 – 60 % concentration of the glycolonitrile can be fully advantageously used. Hence, in this invention, the aqueous glycolonitrile solution of a concentration of about 50 % obtained by the reaction of formalin and hydrocyanic acid, as hereinabove described, is most conveniently used as-obtained as the starting material without concentration or dilution. This also is an advantage from the economical standpoint. Thus, for convenience's sake, the following description is based on the instance where the starting material is an aqueous glycolonitrile solution of about 50 % concentration.

One of the features of step 1 of the present invention resides in the point that, differing from the heretofore used ammonia water or liquid ammonia, gaseous ammonia is used in forming commercially advantageously the glycinonitrile. The gaseous ammonia that is fed continuously to the reactor along with the glycolonitrile is fed in an amount of at least about 3 mols per each mol of the glycolonitrile. The use of the ammonia in an amount of less than 3 mols does not give a satisfactory rate of selectivity in the conversion of glycolonitrile to glycinonitrile. The ammonia is fed in an amount ranging from 4 to 6 mols for obtaining a satisfactory rate of selectivity and for facilitating the operation, the upper limit being about 8 mols. While it is possible to use the ammonia in excess of this upper limit, a proportionate improvement in the selectivity is not realized. Moreover, an increase takes place in the pressure of the reaction system, and it becomes necessary to use a pressure reactor. It is most preferred to introduce the gaseous ammonia from the bottom part of the reactor via a diffuser.

The reaction should be carried out at a temperature lower than 70°C. When 70°C. is exceeded, there is the possibility of bringing about the decomposition of the formed glycinonitrile. On the other hand, a temperature of less than 30°C. is impractical in that a considerable drop takes place in the reaction speed. Hence, a reaction temperature of 30° – 70°C. is preferred, especially preferred being 40° – 60°C. The reaction proceeds smoothly under autogenous pressure of the reaction system with no special need to apply pressure. While the autogenous pressure varies depending upon the amount fed of the ammonia and the reaction speed, it is at most several $kg/cm^2$, and hence a pressure reactor need not be used. While the dwell time of the reactants in the reactor will vary depending upon the reaction conditions, a theoretical yield of the glycinonitrile of about 94 – 95 % based on the glycolonitrile can be readily realized in about 0.5 hour to 2 hours. With the passage of this dwell time, the reaction solution is continuously transferred to another vessel, where the pressure is released and the system reverts to normal atmospheric pressure. The excess ammonia that is thus flashed is then recycled to the reactor as a part of the ammonia gas to be fed to the reactor.

When the heretobefore used ammonia water is used as an amination agent in the above-described reaction, the yield of glycinonitrile is low even under optimum conditions, being about 90 – 92 %. On the other hand, when liquid ammonia is used, a yield of about 95 – 96 % is possible under optimum conditions. However, the pressure of the reaction system becomes about 10 – 15 $kg/cm^2$, and a reactor and auxiliary equipment that are pressure resistant become necessary. Further, for recovering and recycling the excess ammonia in the form of liquid ammonia, a liquefaction apparatus and auxiliary equipment thereof also become necessary. Thus, the great increase in expense that is involved in providing the necessary equipment and its operation far exceeds the benefits that are obtained by the slightly higher yield of the glycinonitrile.

It can thus be appreciated from the foregoing discussion that the invention process which uses gaseous ammonia is commercially an exceedingly advantageous method because of its satisfactory yield and its ease of recovery and utilization of the ammonia, as well as the fact that the reaction equipment required is simple and inexpensive. In addition, since in feeding the gaseous ammonia to the reactor the only requirement is to adjust the feed valve so as to maintain the autogenous pressure of the reaction system whose conditions, once having been established, are constant, the control of the operation is exceedingly simple. Moreover, since the ammonia is introduced in a gaseous state, it is effective in assisting the agitation of the reaction solution.

Of the numerous preliminary experiments that were performed by us, the results obtained in a number of cases are presented below. These experiments of group A are those concerning the formation of glycinonitrile from glycolonitrile.

EXPERIMENT A-1

A 3-liter autoclave was charged with an aqueous glycolonitrile solution (50.4 weight % concentration), following which ammonia gas was introduced to a prescribed pressure. The reaction was then carried out in this state while heating the contents with stirring. Since the pressure drops as a result of the consumption of ammonia with the progress of the reaction, the pressure was maintained by introducing ammonia gas by regulation of the pressure regulation valve. The results of the experiment are shown in Table 1.

Table 1

| Run No. | Reaction pressure (kg/cm$^2$.G) | Reaction temperature (°C.) | Reaction time (hr.) | Glycinonitrile yield (mol %) |
|---|---|---|---|---|
| 1 | 2.0 | 50 | 1.0 | 94.0 |
| 2 | 2.0 | 60 | 1.0 | 94.3 |
| 3 | 2.0 | 70 | 1.0 | 87.6 |
| 4 | 4.0 | 50 | 1.0 | 94.2 |
| 5 | 4.0 | 60 | 1.0 | 94.8 |
| 6 | 4.0 | 70 | 1.0 | 89.1 |

EXPERIMENT A-2

A 3-liter autoclave was charged with an aqueous glycolonitrile solution (50.4 weight % concentration), after which ammonia gas was introduced to a prescribed pressure. The reaction was then carried out at a prescribed temperature with stirring, while in the meantime ammonia gas was continuously introduced by metering with a flow meter. The reaction pressure was maintained by opening and closing by means of a pressure regulator an outlet valve connected to the gaseous phase portion of the autoclave. The ammonia gas was dispersed into the aqueous glycolonitrile solution via a diffuser of sintered metal. The results of the experiment are shown in Table 2.

Table 2

| Run No. | Reaction pressure (kg/cm$^2$.G) | Reaction temperature (°C.) | Reaction time (hr.) | Amount of ammonia fed* | Glycino-nitrile yield(mol%) |
|---|---|---|---|---|---|
| 1 | 2.0 | 50 | 1.0 | 2.0 | 95.3 |
| 2 | 2.0 | 50 | 1.0 | 4.0 | 95.6 |

*Amount of ammonia fed per hour (mol/hr.)/Amount of glycolonitrile charged (mol)

EXPERIMENT A-3

A small quantity of water was added to a 3-liter autoclave, following which ammonia gas was introduced to prepare a saturated ammonia water of prescribed pressure. After raising the temperature to a prescribed temperature, an aqueous glycolonitrile solution (50.4 weight % concentration) was fed at a constant rate, while in the meantime ammonia gas was introduced as in Experiment A-1. After stopping the feed of the aqueous glycolonitrile solution after a prescribed period of time, the pressure was maintained at a prescribed pressure for a prescribed period of time. The results of the experiment are shown in Table 3.

Table 3

| Run No. | Initial amount of water(g) | Reaction pressure (kg/cm$^2$.G) | Reaction temperature (°C.) | Feed time of glyco-lonitrile(hr) | Reaction time* (hr) | Amount of glycolo-nitrile fed(mol.) | Yield of glyci-nonitrile (%) |
|---|---|---|---|---|---|---|---|
| 1 | 202 | 2.0 | 50 | 0.5 | 0.5 | 9.7 | 94.0 |
| 2 | 202 | 2.0 | 60 | 0.5 | 0.5 | 7.5 | 95.1 |

*Reaction time after stoppage of glycolonitrile feed.

EXPERIMENT A-4

The reaction was carried out while continuously feeding gaseous amonia and an aqueous glycolonitrile solution (50.4 weight % concentration) in a prescribed ratio to a continuous reaction apparatus of 1-liter capacity. The reaction time (average dwell time) was adjusted by maintaining the amount of the reaction liquid at a constant level. The gaseous ammonia was dispersed into the liquid via a diffuser disposed at the bottom part of the reaction apparatus. The results obtained are shown in Table 4. In the table, GON stands for glycolonitrile.

Table 4

| Run No. | $NH_3$/GON mol ratio | Reaction temperature (°C.) | Reaction pressure (kg/cm$^2$.G) | Reaction time (hr) | Yield of glycino-nitrile(%) |
|---|---|---|---|---|---|
| 1 | 2.0 | 60 | 0.3 | 1.0 | 85.0 |
| 2 | 4.0 | 60 | 4.4 | 1.0 | 94.6 |
| 3 | 2.0 | 40 | 0 | 1.0 | 80.1 |
| 4 | 4.0 | 40 | 2.0 | 1.0 | 91.9 |
| 5 | 6.0 | 40 | 4.6 | 1.0 | 94.0 |
| 6 | 8.0 | 40 | 6.8 | 1.0 | 94.2 |

Table 4 – Continued

| Run No. | $NH_3$/GON mol ratio | Reaction temperature (°C.) | Reaction pressure (kg/cm².G) | Reaction time (hr) | Yield of glycinonitrile(%) |
|---|---|---|---|---|---|
| 7 | 2.0 | 80 | 1.1 | 1.0 | 60.1 |
| 8 | 4.0 | 50 | 2.8 | 1.0 | 94.1 |
| 9 | 6.0 | 50 | 6.8 | 1.0 | 94.8 |
| 10 | 4.0 | 60 | 4.4 | 0.5 | 94.0 |
| 11 | 4.0 | 60 | 4.2 | 2.0 | 91.5 |
| 12 | 4.0 | 60 | 4.0 | 4.0 | 72.3 |

EXPERIMENT A-5

This experiment, by way of comparison, was carried out using ammonia water as the amination agent.

A 200-ml autoclave was charged with an aqueous glycolonitrile solution (50.4 weight % concentration) and ammonia water (28.0 weight % concentration), after which the reaction was carried out for a prescribed period of time while heating the contents with stirring. The results obtained are shown in Table 5.

Table 5

| Run No. | $NH_3$/GON mol ratio | Reaction pressure (kg/cm².G) | Reaction temperature (°C.) | Reaction time (hr) | Yield of glycinonitrile(%) |
|---|---|---|---|---|---|
| 1 | 4.0 | 1.0 | 60 | 1.0 | 82.2 |
| 2 | 6.0 | 0.8 | 60 | 1.0 | 90.0 |
| 3 | 8.0 | 0.8 | 60 | 1.0 | 92.0 |
| 4 | 6.0 | 0.7 | 60 | 0.25 | 75.7 |
| 5 | 6.0 | 0.7 | 60 | 0.5 | 91.3 |
| 6 | 6.0 | 1.0 | 70 | 0.25 | 85.3 |
| 7 | 6.0 | 1.0 | 70 | 0.5 | 91.3 |
| 8 | 6.0 | 1.0 | 70 | 1.0 | 86.5 |
| 9 | 6.0 | 1.8 | 80 | 1.0 | 83.0 |

EXPERIMENT A-6

This experiment, by way of comparison, was carried out using liquid ammonia as the amination agent.

A 200-ml autoclave was charged with an aqueous glycolonitrile solution (50.4 weight % concentration) and liquid ammonia, and the reaction was carried out for a prescribed period of time while heating the contents with stirring. The results obtained are shown in Table 6.

Table 6

| Run No. | $NH_3$/GON mol ratio | Reaction pressure (kg/cm².G) | Reaction temperature (°C.) | Reaction time (hr) | Yield of glycinonitrile(%) |
|---|---|---|---|---|---|
| 1 | 6.0 | 9.0 | 60 | 1.0 | 95.7 |
| 2 | 8.0 | 12.7 | 60 | 1.0 | 96.0 |
| 3 | 6.0 | 12.3 | 70 | 1.0 | 93.5 |
| 4 | 6.0 | 15.6 | 80 | 1.0 | 86.4 |
| 5 | 8.0 | 16.7 | 70 | 1.0 | 94.1 |
| 6 | 8.0 | 20.5 | 80 | 1.0 | 89.5 |
| 7 | 6.0 | 9.2 | 60 | 0.5 | 92.3 |
| 8 | 6.0 | 8.8 | 60 | 2.0 | 92.3 |

The aqueous solution of glycinonitrile obtained by step 1 of the invention described above is then transferred to step 2, the hydrolysis step. If desired, the foregoing aqueous solution can be submitted to evaporation under reduced pressure before it is transferred to step 2. By this evaporation the impurities which are possibly contained in the aqueous solution can be removed. This evaporation is thus preferably carried out, since it serves to make the execution of the subsequent steps more smooth. Since there is the possibility of causing the decomposition of the glycinonitrile when the evaporation operation is carried out for too long a period, it is important to carry out this operation for a relatively short period of time under considerably reduced pressure. For instance, the ammonia, hydrocyanic acid and the methanol deriving from the initial material formalin are evaporated and removed at 30° – 70°C. under reduced pressure of 50 – 200 mmHg, followed by distilling off the glycinonitrile and water at 30° – 100°C. under reduced pressure of 5 – 200 mmHg to separate the polymeric by-products as a still residue.

Next, the hydrolysis step by means of step 2 of the invention will be described. An aqueous solution of an alkali glycinate, the hydrolytic product of glycinonitrile is obtained by contacting the aqueous glycinonitrile solution obtained in step 1 with an aqueous caustic alkali solution. As the caustic alkali, most advantageously used is the inexpensive caustic soda. It is used in a stoichiometric amount or a slight excess, i.e., at the rate of 1 – 1.1 mol of the caustic alkali per each mol of glycinonitrile. The use of a slight excess of the caustic alkali is to be preferred, for it not only facilitates the operation but increases the reaction speed as well. The greater the concentration of the aqueous caustic alkali solution, the more it is to be preferred. An aqueous caustic soda solution of a maximum concentration of about 50 % is commercially available. It is a disadvantage to use an acid for carrying out the hydrolysis, because a twofold molar quantity is required, since it is also consumed for neutralizing the ammonia that is formed as a by-product.

Favorably used as the temperature for carrying out the hydrolysis is one below the temperature at which the combined aqueous solution boils, preferably a temperature ranging from about 60°C. to the boiling point of said aqueous solution (about 110°C.). On the other hand, as the pressure, a pressure ranging between normal atmospheric pressure and a pressure slightly below normal pressure, e.g., between normal atmospheric pressure and a lower pressure of several tens of mmHg, is advantageously employed.

The above-described hydrolysis proceeds substantially quantitatively to yield an aqueous solution of an alkali glycinate.

The aqueous alkali glycinate solution obtained in step 2 is then treated in step 3 with a stoichiometric amount of a reagent selected from sulfuric acid, hydrochloric acid and the ammonium salts of these acids. As a result of this treatment, an aqueous solution containing free glycine and an equivalent of an alkali metal salt of either sulfuric acid or hydrochloric acid is formed. Hence, this treatment is for forming the free glycine by the dealkalization of the alkali glycinate. Similarly, when an ammonium salt of sulfuric or hydrochloric acid is used, glycine and either sodium sulfate or sodium chloride are formed. However, ammonia is formed as a by-product in this case. This treatment of step 3 is carried out at a temperature ranging from room temperature to the temperature at which the aqueous glycinate solution boils. When this treatment is carried out at the temperature at which the aqueous solution boils, a part of the water evaporates thereby to concentrate the aqueous solution. Hence, since the initial stage of the fractional crystallization operation of the next following step 4 can be carried out in the same vessel concurrently with this treatment, this is an exceedingly desirable mode of operation.

Step 4 consists in recovering the lower amino acid by submitting the aqueous solution containing the free amino acid and the alkali metal salt of a mineral acid obtained in step 3, to fractional crystallization in the presence of ammonia.

As previously noted, the solubilities in water of the lower amino acids and the alkali metal salts of meneral acids, such as sodium sulfate or sodium chloride, are close. Consequently, a very complicated and difficult operation is required for separating the two components by submission of the aqueous solutions containing these two components to a fractional crystallization operation. It was hence held that the application of fractional crystallization as a commercial method was uneconomical and thus not effective. However, it has now been found that the difference between the solubilities of the lower amino acids and the alkali metal salts of mineral acids becomes substantially great when a small amount of ammonia is caused to be present in the aqueous medium. As the amount present of ammonia increases, there is hardly any change in the solubility in water of the former, but there is an abrupt drop in the solubility of the latter. The foregoing phenomena are illustrated by the accompanying drawings, FIGS. 1 – 3, which show curves that have been plotted from the results of our measurements.

Figure 2:
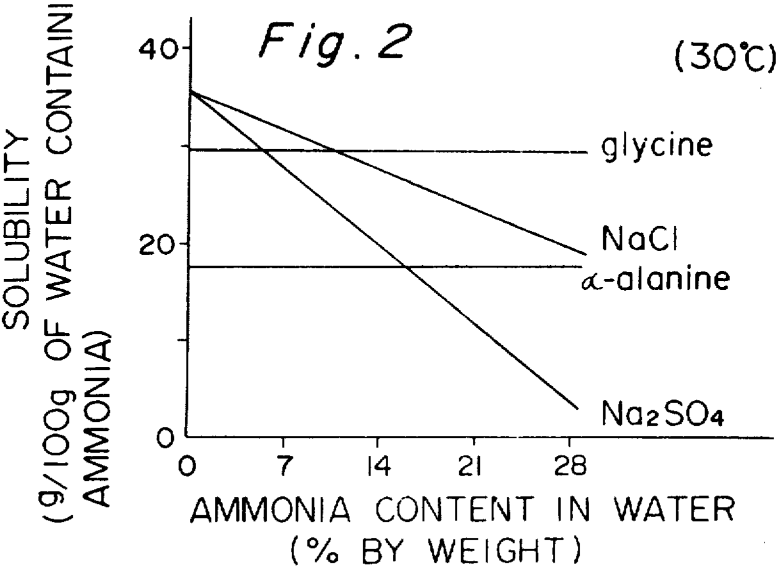
Figure 3:
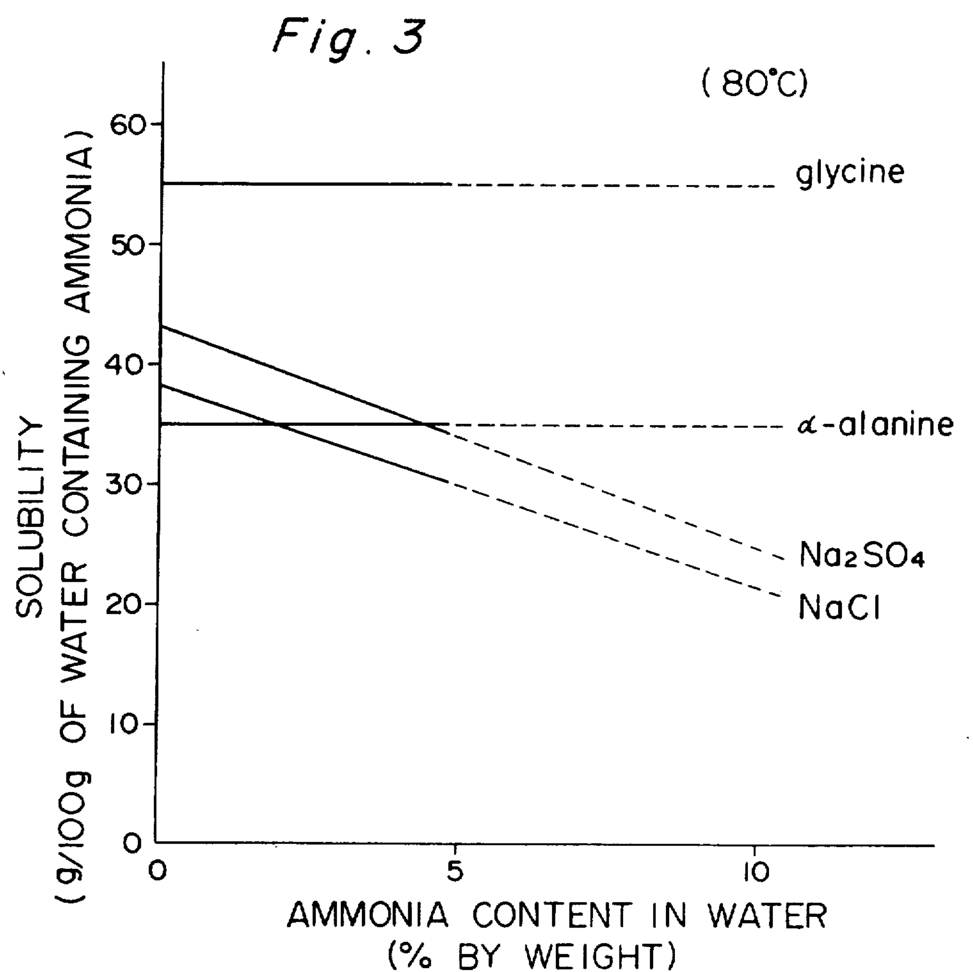

FIG. 1 shows the solubilities in water, at the various temperatures, of glycine, alpha-alanine, sodium sulfate and sodium chloride. FIGS. 2 and 3 show at respectively 30° and 80°C. the solubilities in water of the foregoing compounds in the case where the water contains ammonia in varying amounts. In FIG. 3 the broken line portion indicates the case where the solubility was tested under application of pressure. The solubilities at the other temperatures can be readily determined as required.

It can be seen from FIG. 1 that the solubilities in water of the lower amino acids and the alkali metal salts of mineral acids are close at the various temperatures. On the other hand, it can be seen from FIGS. 2 and 3 that the solubilities of the alkali metal salts of mineral acids drop linearly as the amount present of ammonia increases, whereas the solubilities of the lower amino acids remain nearly constant, thus showing that the difference in solubilities between the two components becomes greater. Step 4 of the present invention is based on the discovery of this fact. This discovery has made it possible to carry out the fractional crystallization of the lower amino acids and the alkali metal salts of mineral acids advantageously on a commercial scale.

Step 4 of this invention can be carried out by the usual fractional crystallization procedure, except for the fact that it is carried out in the presence of ammonia. For instance, as one mode of operation, the following procedure can be followed. The aqueous solution containing glycine and sodium sulfate obtained in step 3 is evaporated and concentrated, and a part of the sodium sulfate is separated out as solids in the presence of ammonia, after which the solution is hot filtered at, say, about 80°C. The filtrate is then cooled to, say, room temperature to crystallize out a part of the glycine, following which the crystallized glycine is recovered by filtration. The remaining glycine and the aqueous solution obtained in step 3 are combined, and the foregoing operation is repeated. By operating in this manner, all of the glycine can be withdrawn as the final product. As can be seen in FIGS. 2 and 3, the difference in the solubilities in water of glycine and sodium sulfate has been enlarged by the presence of ammonia. Hence, the two can be readily separated. There is imposed no restriction on the amount of ammonia to be present; even though the ammonia is present in a small amount, results commensurate therewith are obtained. However, since an increase takes place in the aforementioned difference in solubilities as the amount of the ammonia present increases, the greater the amount added of the ammonia, the more it is to be preferred, the upper limit being the amount which causes the aqueous solution to become saturated at the temperature at which the operation is being carried out. As the ammonia source, the ammonia formed as a by-product in the hydrolysis step 2 can be utilized.

Results of experiments performed by means of several modes of practicing step 4 and results of corresponding control experiments performed in the absence of ammonia are presented below. The experiments of this group are designated Experiments (B).

EXPERIMENT B-1

The hydrolysis was carried out by adding a 50 % aqueous caustic soda solution to a 34 % aqueous glycinonitrile solution, the addition being at a ratio of 1.05 mols of the caustic soda to each mol of the glycinonitrile. This was followed by neutralizing the combined solution with sulfuric acid to obtain a solution of the following composition:

| | |
|---|---|
| Water | 300 kg |
| Glycine | 120 kg |
| Sodium sulfate | 120 kg |

When 117 kg of ammonia was added as gas to this solution at 20°C., 70.2 kg of crude sodium sulfate (calculated as anhydrous sodium sulfate) was separated out. After filtration of the solution, the filtrate was heated up to the boil to remove 117 kg of ammonia and 163 kg of water, following which the filtrate was cooled just up to the point that the sodium sulfate started to crystallize out (30°C.). The glycine precipitated in the meantime was separated by filtration to obtain 71 kg of glycine (purity 99.0 %). The filtrate was then recycled. The per-pass yield was 59 %.

EXPERIMENT B-2 (CONTROL)

A solution consisting of 300 kg of water, 120 kg of glycine and 120 kg of sodium sulfate was obtained by operating as in Experiment B-1. When this solution was concentrated by heating at the boil under normal atmospheric pressure, the steam driven off immediately before the point glycine starts to crystallize out amounted to 159 kg, while the sodium sulfate (anhydrous) separated out during the meantime amounted to 46 kg. When, after filtering this off and in cooling the filtrate to separate out glycine and a small amount of sodium sulfate, the conditions adopted were such that equal amounts of glycine and sodium sulfate would remain in the solution, the temperature to which the solution must be cooled was about 53°C., and 56.5 kg of glycine and 10.5 kg of sodium sulfate were separated out. The composition of the residual solution was 141 kg of water, 63.5 kg of glycine and 63.5 kg of sodium sulfate. The residual solution was then recycled. The filtered off mixture of glycine and sodium sulfate was added with water in an amount sufficient to completely dissolve the mixture at the boil under normal atmospheric pressure and then heated and redissolved. When this solution was similarly cooled to about 53°C. as in the above instance, 46 kg of glycine was separated out, which was filtered off and dried to obtain the product (purity 98.5 %). The filtrate was combined with the previous residual solution and recycled.

In the foregoing control experiment which was performed in the absence of ammonia, the fractional crystallization operation and the recrystallization operation must both be carried out once, and the per-pass yield did not exceed 38 %. While other conditions can be adopted, it can be readily understood that the conditions adopted above give about the best per-pass yield.

EXPERIMENT B-3

Ammonia gas was introduced into a solution consisting of 200 kg of water, 24 kg of alpha-alanine and 60 kg of sodium sulfate until the solution became saturated. The amount of ammonia used was 59 kg, and the amount of sodium sulfate separated out thereby was 41.5 kg (calculated as anhydrous sodium sulfate). After filtering this off, the filtrate was concentrated by heating, driving off 59 kg of ammonia and 132.5 kg of water. The precipitated alpha-alanine was then separated by filtration. 16.2 kg of alpha-alanine having a purity of 98.7 % was obtained. The filtrate containing 7.8 kg of alpha-alanine and 19.5 kg of sodium sulfate (identical ratio of composition as the original solution) was then recycled. The per-pass yield was 67 %.

EXPERIMENT B-4 (CONTROL)

A solution consisting of 200 kg of water, 24 kg of alpha-alanine and 60 kg of sodium sulfate was concentrated at the boil to drive off 122 kg of water, following which the solution was hot-filtered at a temperature slightly lower than the boiling point. 32.7 kg of sodium sulfate was filtered off. When 8.6 kg of hot water was added to the filtrate and it was cooled to 30°C., alpha-alanine was precipitated. When this was separated by filtration, 12.2 kg of crude alanine having a purity of 97.5 % was obtained. (The 8.6 kg of hot water was added for preventing the precipitation of the sodium sulfate, which would otherwise be separated out at the same time by the cooling operation. Thus, a minimum amount of the hot water was added. It was thus possible by this addition to omit the recrystallization operation that was employed in the case of Experiment B-2.) The filtrate containing 11.8 kg of alpha-alanine and 27.3 kg of sodium sulfate (substantially identical ratio of composition as the original solution) was then recycled. The per-pass yield was only 51 %.

EXPERIMENT B-5

Ninety-nine kg of ammonia gas was dissolved at room temperature in a solution consisting of 254 kg of water, 75 kg of glycine and 89 kg of sodium chloride, whereupon 38.2 kg of sodium chloride was precipitated. After filtering off the precipitate, the filtrate was concentrated by heating to remove 99 kg of ammonia and 109 kg of water. This was followed by cooling the filtrate to 30°C. followed by filtration to obtain 31 kg of glycine (purity 99.1 %). The per-pass yield was 41 %.

EXPERIMENT B-6

By operating as in Experiment B-1, a solution consisting of 300 kg of water, 120 kg of glycine and 120 kg of sodium sulfate was obtained, after which this solution was concentrated by heating at 80°C. under reduced pressure. At a point just before the glycine started to crystallize out, the water driven off amounted to 131 kg, while the sodium sulfate (anhydrous) precipitated during the meantime amounted to 47 kg. When the pressure of this solution was reverted to normal atmospheric pressure and ammonia gas was introduced while maintaining the temperature of the solution at 80°C., a further 15 kg of sodium sulfate was crystallized out. When this was hot-filtered and the resulting filtrate was then cooled to 30°C., 61 kg of glycine was crystallized out. This was separated by filtration to obtain glycine of 98.5 % purity. The per-pass yield was 51 %.

Glycine or alpha-alanine of high purity are formed according to the process of the present invention. However, when final products of still higher purity are required as a starting material for the preparation of animal feeds and medicines, it is possible to add the necessary purification step during the course of the invention process or after step 4.

It can be seen from the foregoing discussion that the present invention has made it possible to advantageously practice on a commercial scale the preparation of either glycine or alpha-alanine from glycolonitrile or lactonitrile, an achievement which had been considered impossible and hence was not practiced in the past.

Next, an example will be given illustrating the case where the final product glycine is obtained from the aqueous glycolonitrile solution by the continuous operation of the whole process.

EXAMPLE

While continuously feeding to a continuous reaction apparatus of 0.1 cubic meter capacity gaseous ammonia and an aqueous glycolonitrile solution (48.5 weight %) at a molar ratio of ammonia/glycolonitrile of 4.0, the reaction was carried out for an average dwell time of one hour at a reaction temperature of 60°C. and a reaction pressure of 4.3 kg/cm$^2$ gauge. The starting materials were fed at the following rates: ammonia 1.94 kmol/hr, glycolonitrile 0.485 kmol/hr, water 1.63 kmol/hr.

The concentration of glycinonitrile at the outlet of the reaction apparatus was 28.6 weight %, and the per-pass yield, based on the glycolonitrile, was 94.6 %.

When one cubic meter of the solution leaving the reaction apparatus outlet was flashed under normal atmospheric pressure at 60°C., 185 kg (10.9 kmol) of ammonia was recovered. As a remainder, there was obtained 695 kg of an aqueous glycinonitrile solution (purity 37.0 weight %, containing saturated ammonia).

The so obtained aqueous glycinonitrile solution was mixed with 643 kg of a 30 weight % aqueous caustic soda solution containing 193 kg of caustic soda, after which the mixture was reacted for one hour at 90°C. and normal atmospheric pressure followed by neutralization with 242 kg of 98 % sulfuric acid.

The composition of the resulting solution was as follows:

| | |
|---|---|
| Glycine | 345 kg |
| Sodium sulfate | 342 kg |
| Water, etc. | 862 kg |

Next, the fractional crystallization operation was carried out. The foregoing neutralized reaction solution was concentrated by heating it at the boil to cause 380 kg of the water to evaporate. Then ammonia gas was introduced until the solution became saturated. This was followed by hot-filtering the solution at 80°C. while continuing the introduction of ammonia gas. 164 kg of crude sodium sulfate was obtained.

The filtrate was cooled to 30°C., and the glycine crystallizing out was recovered by centrifuging. 168 kg of light brown crude glycine was obtained. The purity was 98.2 %. The so obtained crude glycine was dissolved in 60°C. hot water and then passed through a column packed with an anion-exchange resin and a cation-exchange resin to remove the sulfate radicals and sodium ions. The solution was then decolorized with active carbon and cooled to 30°C. to crystallize out glycine, which was separated by filtration and dried. Thus was obtained 75 kg of purified glycine of a purity of 99.6 %.

What is claimed is:

1. A process for preparing a lower amino acid selected from the group consisting of glycine and alpha-alanine, said process comprising carrying out in successively disposed vessels, in combination, the step of 1. feeding continuously to a reactor an aqueous cyanohydrin solution of a member selected from the group consisting of glycolonitrile and lactonitrile, and at least about 3 mols of gaseous ammonia per each mol of said cyanohydrin and carrying out the reaction at a temperature below about 70°C. under autogenous pressure to obtain a reaction solution containing the corresponding glycinonitrile or alpha-aminopropionitrile, while in the meantime transferring the reaction solution successively to a separate vessel, where the pressure is released and reverted to normal atmospheric pressure, and recycling to the foregoing reaction the excess ammonia gas that is flashed thereby;
2. contacting the aqueous solution of glycinonitrile or alpha-aminopropionitrile obtained in (1) with an aqueous alkaline solution containing a stoichiometric amount or slight excess of a caustic alkali at a temperature lower than that at which said aqueous solution of glycinonitrile or alpha-aminopropionitrile boils, under normal atmospheric pressure or slightly less to obtain by hydrolysis an aqueous solution of an alkali metal salt of the corresponding lower amino acid;
3. treating the aqueous solution of an alkali metal salt of a lower amino acid obtained in (2) with a stoichiometric amount of a reagent selected from the group consisting of sulfuric acid, hydrochloric acid and the ammonium salts thereof to obtain an aqueous solution containing the corresponding free lower amino acid and alkali metal salt of a mineral acid; and
4. submitting the aqueous solution obtained in (3) to fractional crystallization in the presence of ammonia to isolate and recover the lower amino acid.

* * * * *